US006595532B2

United States Patent
Tanaka

(10) Patent No.: US 6,595,532 B2
(45) Date of Patent: Jul. 22, 2003

(54) RACK-PINION TYPE STEERING APPARATUS

(75) Inventor: Eiji Tanaka, Kashihara (JP)

(73) Assignee: Koyo Seiko Co., Ltd., Osaka (JP)

( * ) Notice: Subject to any disclaimer, the term of this patent is extended or adjusted under 35 U.S.C. 154(b) by 60 days.

(21) Appl. No.: 09/939,796

(22) Filed: Aug. 28, 2001

(65) Prior Publication Data

US 2002/0024190 A1 Feb. 28, 2002

(30) Foreign Application Priority Data

Aug. 30, 2000 (JP) ........................................ 2000-261196

(51) Int. Cl.[7] ................................................. B62D 3/12
(52) U.S. Cl. ................................................. 280/93.515
(58) Field of Search ...................... 280/93.514, 93.515; 180/427

(56) References Cited

U.S. PATENT DOCUMENTS

| 3,745,850 | A | * | 7/1973 | Bayle | 74/422 |
| 3,844,181 | A | * | 10/1974 | Bayle | 74/498 |
| 4,271,716 | A | * | 6/1981 | Carduner | 74/422 |
| 4,593,578 | A | * | 6/1986 | Kobayashi et al. | 74/498 |
| 4,683,769 | A | * | 8/1987 | Mochizuki et al. | 74/422 |
| 4,788,878 | A | | 12/1988 | Morita et al. | |
| 5,022,279 | A | * | 6/1991 | Ueno et al. | 74/422 |
| 5,058,448 | A | * | 10/1991 | Kiyooka et al. | 74/422 |
| 5,622,085 | A | * | 4/1997 | Kostrzewa | 74/498 |
| 5,660,078 | A | * | 8/1997 | Phillips | 74/422 |
| 5,746,285 | A | * | 5/1998 | Yonezawa | 180/428 |

FOREIGN PATENT DOCUMENTS

| EP | 1 086 880 | | 3/2001 | | |
| GB | 2 333 079 | | 7/1999 | | |
| JP | 58113648 A | * | 7/1983 | ........... | F16G/11/02 |
| JP | 63053173 A | * | 3/1988 | ........... | B62D/3/12 |

* cited by examiner

*Primary Examiner*—Lesley D. Morris
*Assistant Examiner*—Paul Royal, Jr.
(74) *Attorney, Agent, or Firm*—Smith, Gambrell & Russell, LLP

(57) ABSTRACT

There is disposed a damper made of a synthetic resin having at least a column-shaped member (pillar-shaped member) of which one end and the other end come in contact with a support yoke and a yoke plug, respectively. This damper restrains a teeth beating noise generated by a rack and a pinion, from being propagated from the support yoke to the yoke plug, lowers its noise pressure level or changes its noise quality.

7 Claims, 3 Drawing Sheets

RACK-PINION TYPE STEERING APPARATUS

FIELD OF THE INVENTION

The present invention relates to a rack-pinion type steering apparatus to be used for a vehicle of an automobile or the like.

DESCRIPTION OF THE PRIOR ART

FIG. 3 is a section view of a main portion of a conventional rack-pinion type steering apparatus. As shown in FIG. 3, the conventional rack-pinion type steering apparatus has a pinion shaft 83 supported, rotatably with respect to a housing 80, by bearings 81, 82 and provided at the tip thereof with a pinion 83a, and a rack shaft 84 supported in a perpendicular direction to the pinion shaft 83 and having a rack 84a to be meshed with the pinion 83a. The pinion shaft 83 is connected to a steering wheel (not shown), and the rack shaft 84 is connected to steering wheels (not shown). A back side of the rack 84a of the rack shaft 84 is made, for example, in the form of a circular arc as shown in FIG. 3.

The housing 80 has a cylindrical support yoke housing hole 80a formed in a perpendicular direction to the rack shaft 84. Housed inside of the support yoke housing hole 80a are a support yoke 85 which supports the rack shaft 84 through a sliding contact member 86 arranged to come in sliding contact directly with the rack shaft 84, a yoke plug 87 disposed at the back side of the support yoke 85 for closing the support yoke housing hole 80a, and a spring 88 interposed, as compressed, between the support yoke 85 and the yoke plug 87.

The sliding contact member 86 is made of metal or a synthetic resin for receiving load exerted to the support yoke 85 from the rack shaft 84, and is mounted in a concaved portion formed in the support yoke 85 as shown in FIG. 3.

The yoke plug 87 is threadedly connected to the end of the support yoke housing hole 80a and is fixed to a predetermined position by a lock nut 89. The support yoke 85 is pushed to the rack shaft 84 by the spring 88 to apply a pre-load across the rack 84a and the pinion 83a.

However, in the above-mentioned conventional rack-pinion type steering apparatus, there are instances where vibration or impact load transmitted to the rack shaft 84 from the steering wheels, causes the rack 84a of the rack shaft 84 and the pinion 83a of the pinion shaft 83 to shake with respect to each other, thus producing a so-called teeth beating noise. Particularly, in the type in which there is applied, to the rack shaft 84, a VGR (Variable Gear Ratio) rack in which the gear ratio is lowered from the center toward the both ends, a high load may possibly be transmitted to the support yoke 85 from the rack shaft 84. Accordingly, the sliding contact member 86 is required to be made of metal. Thus, substantially all contact portions in the support yoke housing hole 80a are made of metal. Therefore, the teeth beating noise is successively propagated from the rack shaft 84 to the sliding contact member 86, the support yoke 85 and the yoke plug 87, and then transmitted to the outside through the housing 80. As a result, the conventional rack-pinion type steering apparatus is disadvantageous in that the teeth beating noise is transmitted, as abnormal noise, to the driver, causing the same to be unpleasant.

OBJECT AND SUMMARY OF THE INVENTION

In view of the problem of prior art above-mentioned, it is an object of the present invention to provide a rack-pinion type steering apparatus capable of restraining a teeth beating noise generated due to shaking of the rack and the pinion with respect to each other, from being transmitted, as abnormal noise, to the driver, thus restraining the driver from becoming unpleasant.

To achieve the object above-mentioned, a rack-pinion type steering apparatus according to the present invention comprises:

a housing;

a pinion shaft supported rotatably with respect to the housing and provided at the tip thereof with a pinion;

a rack shaft provided on a lateral side thereof with a rack to be meshed with the pinion;

a support yoke slidably housed in a cylindrical support yoke housing hole formed in the housing for supporting the rack shaft at its back side;

a biasing member of which one end comes in contact with the support yoke for biasing the same toward the rack shaft such that the rack and the pinion are meshed with each other at a predetermined pressure;

a yoke plug attached to the housing for receiving the other end of the biasing member and for closing the support yoke housing hole; and a damper made of a synthetic resin having at least a pillar-shaped member of which one end and the other end come in contact with the support yoke and the yoke plug, respectively.

In the rack-pinion type steering apparatus of the above construction, there is disposed the damper made of a synthetic resin having at least a pillar-shaped member of which one end and the other end come in contact with the support yoke and the yoke plug, respectively. Accordingly, even though a teeth beating noise is generated due to shaking of the rack and the pinion with respect to each other, the damper can restrain the teeth beating noise from being propagated from the support yoke to the yoke plug, lower the teeth beating noise in noise pressure level, or change the teeth beating noise in noise quality. This restrains the teeth beating noise from being transmitted, as abnormal noise, to the driver, thus restraining the driver from becoming unpleasant.

In the above rack-pinion type steering apparatus, the biasing member is formed by a compression coiled spring disposed at the center portion of the support yoke housing hole, and the pillar-shaped member is disposed inside of the compression coiled spring, and the damper has a ring-shaped member disposed around the compression coiled spring with one end and the other end of the ring-shaped member coming in contact with the support yoke and the yoke plug, respectively.

In this case, both the pillar-shaped member and the ring-shaped member restrain the teeth beating noise from being propagated. Further, two separate members, i.e., the pillar-shaped member and the ring-shaped member respectively disposed inside and around the compression coiled spring, form the damper. Therefore, it is possible to attach the pillar-shaped member and the ring-shaped member to an existing rack-pinion type steering apparatus using in, for example an automobile without changing the compression coiled spring etc. in this apparatus. Thus, this existing rack-pinion type steering apparatus can readily be improved in the ability of restraining the teeth beating noise.

In the above rack-pinion type steering apparatus, the damper is preferably made of a urethane resin.

In this case, the propagation of the teeth beating noise can be restrained more efficiently because the damper is made of the urethane resin.

In the above rack-pinion type steering apparatus, a belleville spring is preferably interposed between the opposite end surfaces of the support yoke and the yoke plug.

In this case, the belleville spring securely receives the support yoke which tends to swing at an angle with respect to the axial direction of the support yoke housing hole, thus restraining the support yoke from swinging.

In the above rack-pinion type steering apparatus, a metal sheet is preferably interposed between the rack shaft and the support yoke.

In this case, the metal sheet improves the heat-resistant properties and the wear-resistant properties for the rack shaft because the support yoke is not directly rubbed with the rack shaft. Accordingly, even though a high load is exerted to the support yoke from the rack shaft, the support yoke can support the rack shaft without the metal sheet being deformed or molten.

DESCRIPTION OF THE PREFERRED EMBODIMENTS

The following description will discuss an embodiment of the present invention with reference to attached drawings. In the following, there is discussed, as an example, the case in which a rack-pinion type steering apparatus of the present invention is applied to a hydraulic power steering apparatus.

Figure 1:
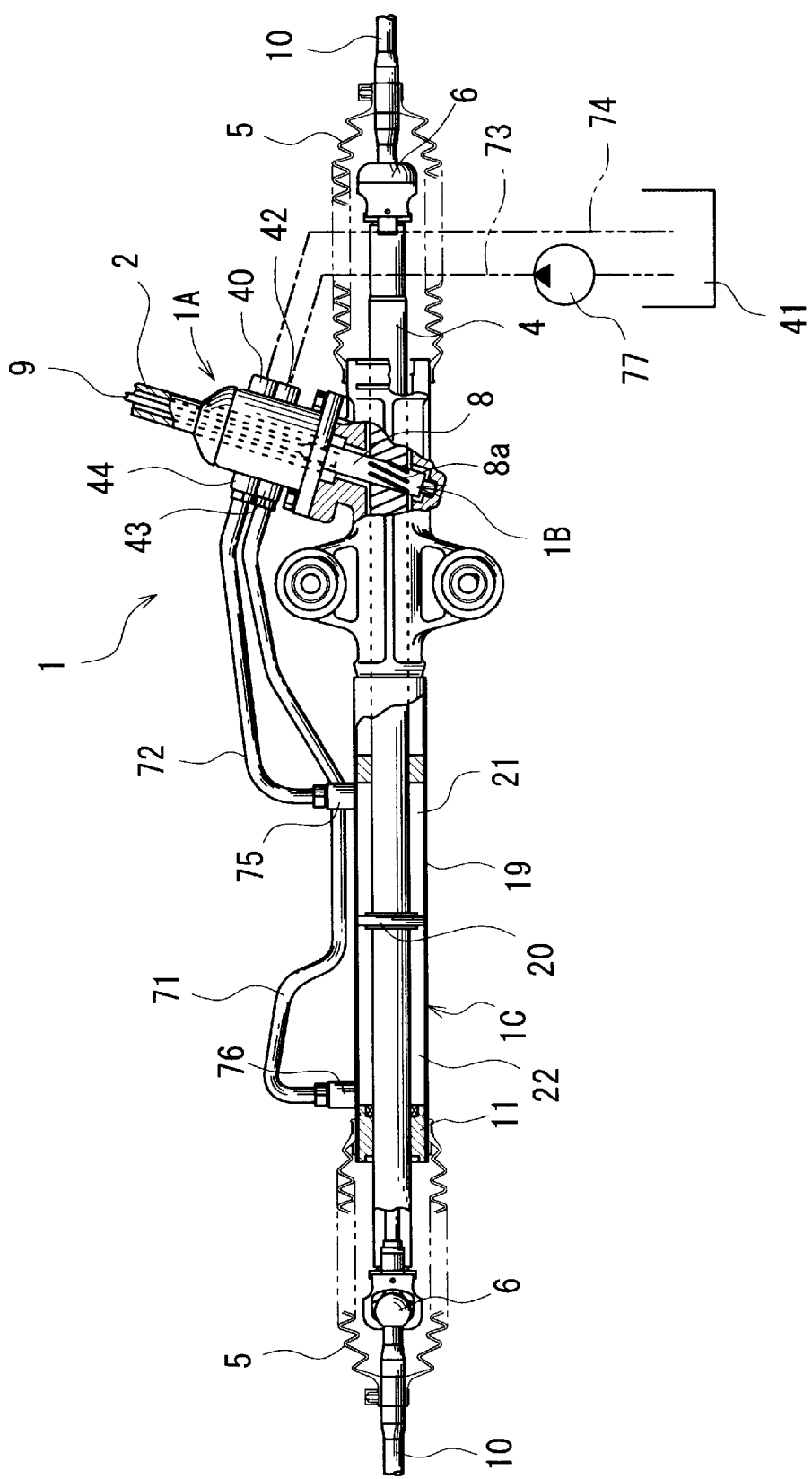
FIG. 1 is a front view, with portions broken away, of a whole rack-pinion type steering apparatus of the present invention.

With reference to FIG. 1, the following description will discuss the entire arrangement of a rack-pinion type steering apparatus of the present invention. The steering apparatus 1 is a rack-pinion type hydraulic power steering apparatus which comprises a valve device 1A, a rack-pinion device 1B, and a hydraulic cylinder device 1C connected to one another. The steering apparatus 1 is arranged such that an auxiliary steering force supplied by oil pressure is added, according to a steering operation, to the steering force given to a rack shaft 4 from a pinion shaft 8 as an pinion shaft.

A rotary valve is disposed in the valve device 1A. Inserted into the center part of the rotary valve are an input shaft 2 connected to a steering wheel (not shown), and a torsion bar 9 of which only upper portion is secured to the input shaft 2. The lower end of the torsion bar 9 is connected to the pinion shaft 8 such that a steering force (rotation torque) given to the input shaft 2 is transmitted to the pinion shaft 8 through the torsion bar 9. Accordingly, the input shaft 2 is rotatable with respect to the pinion shaft 8 by an amount corresponding to the twist of the torsion bar 9 according to steering resistance.

The valve device 1A is provided on the outer peripheral surface thereof with an inlet port 42, an outlet port 40, and first and second pipe connection ports 43, 44. The inlet port 42 is connected to a pump 77 through a pipe 73. An operating oil sucked from a tank 41 by the pump 77 is supplied to the valve device 1A at predetermined pressure. The outlet port 40 is connected to the tank 41 through a pipe 74 such that the operating oil discharged from the valve device 1A is returned to the tank 41.

Tie rods 10 are connected, through ball joints 6, to the transverse ends of the rack shaft 4. Steering wheels are connected to the tie rods 10 through knuckle arms or the like such that the wheels are steered according to the transverse movement of the rack shaft 4.

The hydraulic cylinder device 1C connected to the rack-pinion device 1B, forms a cylinder in which the transverse movement of the rack shaft 4 serves as a piston motion, and is disposed as an actuator for giving an auxiliary steering force. The hydraulic cylinder device 1C is mainly formed by a cylinder tube 19 serving as a housing, and a piston 20 formed integrally with the rack shaft 4. This piston 20 partitions the inside of the cylinder tube 19 to form a pair of oil chambers 21, 22. The cylinder tube 19 is provided on the outer peripheral surface thereof with pipe connection ports 75, 76 respectively corresponding to the oil chambers 21, 22. These pipe connection ports 75, 76 are connected, through pipes 72, 71, to the pipe connection ports 44, 43 of the valve device 1A. The cylinder tube 19 is covered, at both ends thereof, with bellows-type boots 5 to prevent dirt, dust or the like from entering inside of the cylinder tube 19.

A ring-shaped end cap 11 is interposed between the rack shaft 4 and the cylinder tube 19 at an end of the oil chamber 22, and the rack shaft 4 is slidably inserted inside of the end cap 11. The end cap 11 is provided at the inner and outer peripheries thereof with seals for hermetically sealing the oil chamber 22.

Figure 2:
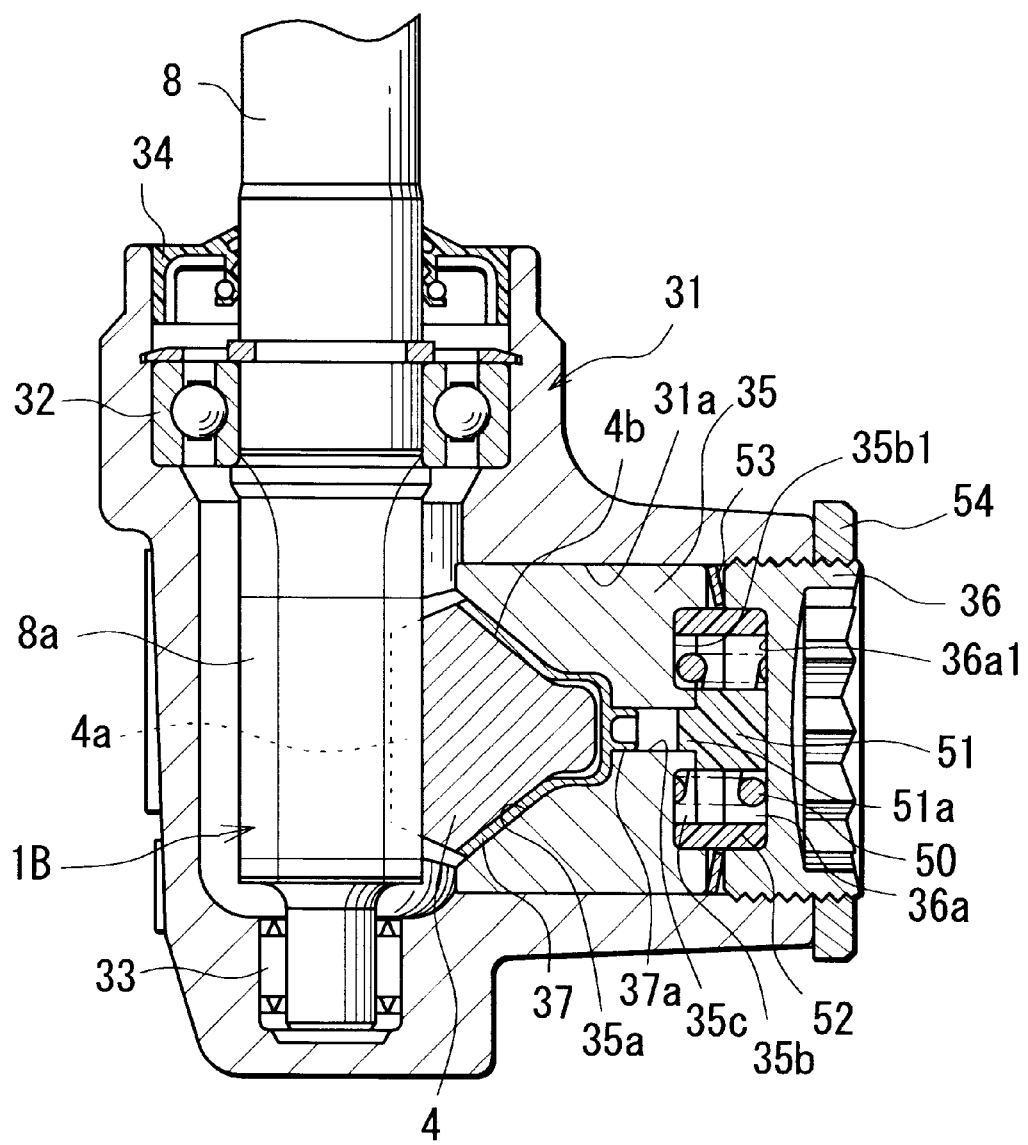
FIG. 2 is a section view of a main portion of the rack-pinion type steering apparatus shown in FIG. 1.
Figure 3:
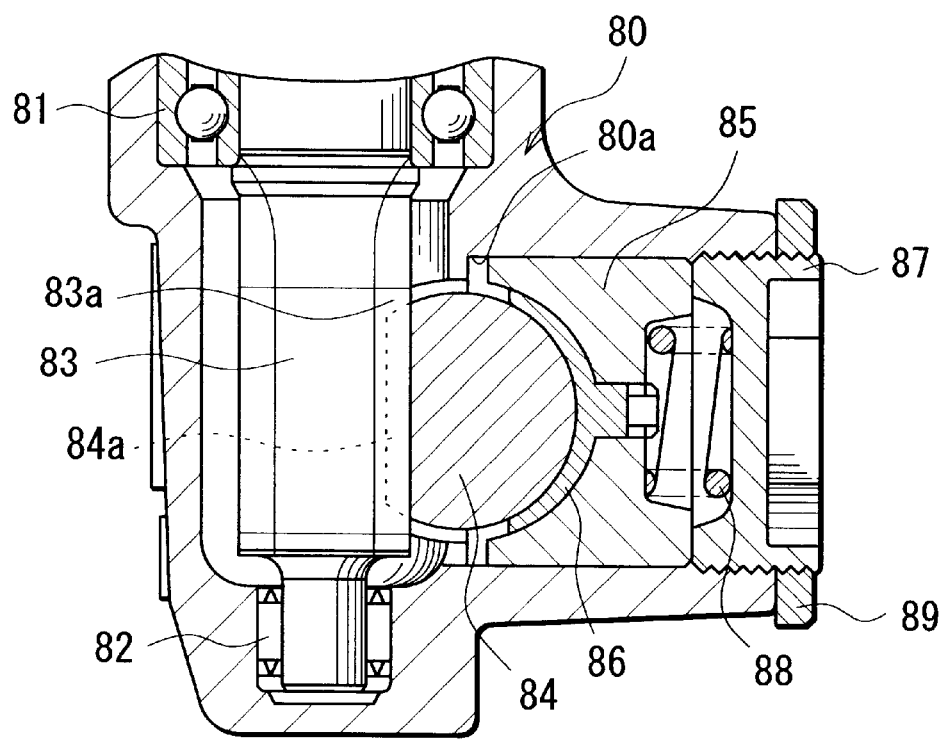
FIG. 3 is a section view of a main portion of a conventional rack-pinion type steering apparatus.

As shown in FIG. 2, the rack-pinion device 1B has the pinion shaft 8 supported, rotatably with respect to a housing 31, by bearings 32, 33 and provided at the tip thereof with a pinion 8a, and the rack shaft 4 supported in a perpendicular direction to the pinion shaft 8 and provided at a lateral side thereof with a rack 4a to be meshed with the pinion 8a. An oil seal 34 is mounted between the upper end of the housing 31 and the pinion shaft 8. The housing 31 also serves as a housing of the valve device 1A. FIG. 1 shows the rack shaft 4 having a Y-shape section, but the rack shaft 4 may have, for example, a circular-arc section as shown in FIG. 3.

The housing 31 has a cylindrical support yoke housing hole 31a formed in a perpendicular direction to the rack shaft 4. Housed inside of the support yoke housing hole 31a are a substantially column-shaped support yoke 35 which supports the rack shaft 4 at the back side 4b of the rack 4a, a yoke plug 36 attached to the housing 31 for closing the support yoke housing hole 31a, and a compression coiled spring 50 serving as a biasing member interposed between the support yoke 35 and the yoke plug 36. Disposed inside of the support yoke housing hole 31a are a column-shaped member 51 and a ring-shaped member 52 which serve as a damper, and a belleville spring 53 in close vicinity to the inner peripheral surface of the support yoke housing hole 31a.

The support yoke 35 is held inside of the support yoke housing hole 31a so as to be slightly slidable in the right and left directions in FIG. 2, and is biased in the left direction by the compression coiled spring 50. The support yoke 35 is provided at the rack shaft 4 side with a Y-shape (sideways) valley portion 35a corresponding to the shape of the back side 4b of the rack 4a. The support yoke 35 is provided at the end thereof opposite to the valley portion 35a with a concaved portion 35b, and has a substantially column-shaped through-hole 35c through which the valley portion 35a and the concaved portion 35b communicate with each other.

Attached to the valley portion 35a is a metal sheet 37 serving as a sliding contact member which comes in sliding contact with the rack shaft 4. The metal sheet 37 is for example made by laminating a copper plate on a steel plate to form a laminated plate and coating the laminated plate with fluoro plastics, and has a shape corresponding to the shape of the valley portion 35a. Furthermore, the metal sheet 37 has a projecting portion 37a, which is pressed into the through-hole 35c in the support yoke 35. Accordingly, the metal sheet 37 is integrally attached to the support yoke 35. Therefore, even though load is applied to the metal sheet 37 from the rack shaft 4, the metal sheet 37 can be maintained as mounted on the valley portion 35 a without any positional shift on the support yoke 35.

In the foregoing, the description has been made of the arrangement in which the through-hole 35c is formed in the support yoke 35 and the projecting portion 37a is pressed into the through-hole 35c. However, the support yoke 35 may have, instead of the through-hole 35c, a concave or a groove into which the projecting portion 37a is pressed, such that the support yoke 35 and the metal sheet 37 are made in a unitary structure.

The metal sheet 37 above-mentioned is interposed between the rack shaft 4 and the support yoke 35. Therefore, it is possible to improves the heat-resistant properties and the wear-resistant properties for the rack shaft 4. Accordingly, even though a high load is exerted to the support yoke 35 from the rack shaft 4, the support yoke 35 can support the rack shaft 4 without the metal sheet 37 being deformed or molten.

As shown in FIG. 2, the yoke plug 36 is threadedly connected to the opening end of the support yoke housing hole 31a and is fixed to a predetermined position by a lock nut 54. The yoke plug 36 is provided at its end at the side of the support yoke 35 with a concaved portion 36a which is made, for example, in the form of a case.

The compression coiled spring 50 has one end which comes in contact with a bottom surface 35b1 of the concaved portion 35b of the support yoke 35, and the other end which comes in contact with a bottom surface 36a1 of the concaved portion 36a of the yoke plug 36. The compression coiled spring 50 is interposed, as compressed, between the support yoke 35 and the yoke plug 36. Further, the compression coiled spring 50 is disposed at the center portion of the support yoke housing hole 31a. The column-shaped member 51 is disposed inside of the compression coiled spring 50 and the ring-shaped member 52 is disposed around the compression coiled spring 50. The biasing force of the compression coiled spring 50 causes the support yoke 35 to be pushed to the rack shaft 4 through the metal sheet 37, such that the rack 4a and the pinion 8a are meshed with each other under a predetermined pressure.

The column-shaped member 51 and the ring-shaped member 52 are made of a synthetic resin. Their one ends come in contact with the support yoke 35, and their other ends come in contact with the yoke plug 36. The column-shaped member 51 and the ring-shaped member 52 restrain a teeth beating noise generated by the pinion 8a and the rack 4a, from being propagated from the support yoke 35 to the yoke plug 36, lower the teeth beating noise in noise pressure level, or change the teeth beating noise in noise quality.

The column-shaped member 51 is provided at one end thereof at the side of the support yoke 35 with a column-shaped projection 51a, which is pressed into the through-hole 35c in the support yoke 35. By disposing such a projection 51a, the column-shaped member 51 can readily integrally be attached to the support yoke 35, and the column-shaped member 51 can readily and securely be inserted in and attached to the support yoke housing hole 31a. As a result, the assembling of the rack-pinion type steering apparatus can be simplified. In the foregoing, the description has been made of the arrangement in which the column-shaped member 51 is integrally attached to the support yoke 35 and the resultant unitary structure is then disposed inside of the support yoke housing hole 31a. However, provision may be made such that the column-shaped member 51 is integrally attached to the yoke plug 36 and the resultant unitary structure is then disposed inside of the support yoke housing hole 31a.

The ring-shaped member 52 is fitted in the concaved portion 35b of the support yoke 35 or the concaved portion 36a of the yoke plug 36, such that the ring-shaped member 52 is integrally attached to the support yoke 35 or the yoke plug 36. Thereafter, the resultant unitary structure is disposed in the support yoke housing hole 31a with the outer peripheral surface of the ring-shaped member 52 coming in close contact with both the inner peripheral surface of the concaved portion 35b of the support yoke 35 and the inner peripheral surface of the concaved portion 36a of the yoke plug 36. Thus, the ring-shaped member 52 is fitted into the concaved portion 35b or the concaved portion 36a, and then disposed inside of the support yoke housing hole 31a together with the support yoke 35 or the yoke plug 36 with which the ring-shaped member 52 has been made in a unitary structure. This facilitates and assures the insertion and attachment of the ring-shaped member 52 into the support yoke housing hole 31a. This results in simplification of assembling of the rack-pinion type steering apparatus.

When not compressed, i.e., extending substantially in free length, the column-shaped member 51 and the ring-shaped member 52 are located between the support yoke 35 and the yoke plug 36.

The column-shaped member 51 and the ring-shaped member 52 are formed by injection molding or cutting. The hardness determined by the material and the thickness is suitably selected in view of the durability against the load from the support yoke 35 and the properties of absorbing a teeth beating noise. In forming the column-shaped member 51 and the ring-shaped member 52 by injection molding, the column-shaped member 51 and the ring-shaped member 52 are individually formed by a general method using metal molds. However, the column-shaped member 51 may also be formed by a so-called insert molding method by which resin is injected, for example, directly to the support yoke 35 with which the column-shaped member 51 is to be made in a unitary structure.

The belleville spring 53 has holes through which the compression coiled spring 50, the column-shaped member 51 and the ring-shaped member 52 pass respectively. When not compressed, the belleville spring 53 is located between the support yoke 35 and the yoke plug 36. As mentioned earlier, the belleville spring 53 is disposed in close vicinity to the inner peripheral surface of the support yoke housing hole 31a. Accordingly, the belleville spring 53 securely receives the support yoke 35 which tends to swing at an angle with respect to the axial direction of the support yoke housing hole 31a. Thus, the belleville spring 53 restrains the support yoke 35 from swinging. This restrains a so-called fretting that the external periphery of an end of the support yoke 35 is caught by the inner peripheral surface of the support yoke housing hole 31a due to the swing above-mentioned.

In the rack-pinion type steering apparatus having the arrangement above-mentioned, even though the teeth beating noise is generated due to shaking of the rack 4a and the pinion 8a with respect to each other, the column-shaped member 51 and the ring-shaped member 52 both made of a synthetic resin, restrain the teeth beating noise from being propagated from the support yoke 35 to the yoke plug 36, lower the teeth beating noise in noise pressure level or change the teeth beating noise in noise quality. As a result, the rack-pinion type steering apparatus of this embodiment can restrain the teeth beating noise as above-mentioned from being transmitted, as abnormal noise, to the driver, thus restraining the driver from becoming unpleasant.

In the rack-pinion type steering apparatus of this embodiment, the column-shaped member 51 and the ring-shaped member 52 are respectively disposed inside and outside of the compression coiled spring 50 positioned at the center portion of the support yoke housing hole 31a, such that the teeth beating noise is absorbed. Accordingly, the column-shaped member 51 and the ring-shaped member 52 can be attached to an existing rack-pinion type steering apparatus using in vehicle such as automobile without changing its component elements such as the compression coiled spring 50 and the support yoke 35 in contact therewith. Therefore, such an existing rack-pinion type steering apparatus can readily be improved in the ability of restraining the teeth beating noise (abnormal noise).

According to tests conducted by the inventors of the present invention, it was confirmed that the teeth beating noise is restrained more efficiently when the column-shaped member 51 and the ring-shaped member 52 (damper) are made of a urethane resin. Further, in addition to the teeth beating noise restraining ability, such a damper is advantageous in the following point. In the damper made of a urethane resin, by changing the polymerization degree of polyester or polyether contained in the urethane resin, the frequency or amplitude of vibration or noise transmitted in the damper can readily be changed. For example, a pulse-wave-shaped teeth beating noise such as rapping noise can be converted into a smooth sound. That is, the teeth beating noise can be changed in noise quality and converted into sound which does not give an unpleasant feeling to the driver.

In the foregoing, the description has been made of the arrangement in which the damper is formed by the column-shaped member 51 disposed inside of the compression coiled spring 50 and the ring-shaped member 52 disposed therearound. However, the present invention is not limited to this arrangement. For example, the damper may be arranged such that the compression coiled spring 50 is increased in axial diameter, the column-shaped member 51 having a large diameter is disposed inside of the compression coiled spring 50 and the ring-shaped member 52 is omitted. Further, the member 51 is not limited to a column-shaped member, but may be a pillar-shaped member having a polygonal section or the like of which one end and the other end come in contact with the support yoke 35 and the yoke plug 36 respectively.

In the foregoing, the description has been made of the arrangement in which the yoke plug 36 is provided with the concaved portion 36a having the bottom surface 36a1 which comes in contact with the other end of the compression coiled spring 50 (biasing member). However, this biasing member may be a member which biases the support yoke 35 toward the rack shaft 4 and causes the rack 4a and the pinion 8a to be meshed with each other at a predetermined pressure. More specifically, the present invention may be arranged such that the support yoke 35 is provided with a hole capable of housing the biasing member and that the yoke plug 36 is provided at an end thereof with a surface which comes in contact with an end of the biasing member housed in the hole.

What is claimed is:

1. A rack-pinion type steering apparatus comprising:

a housing;

a pinion shaft supported rotatably with respect to said housing and provided at the tip thereof with a pinion;

a rack shaft provided o a lateral side thereof with a rack to be meshed with said pinion;

a support yoke slidably housed in a cylindrical support yoke housing hole formed in said housing for supporting said rack shaft at its back side;

a biasing member of which one end comes in contact with said support yoke for biasing the same toward said rack shaft such that said rack and said pinion are meshed with each other at a predetermined pressure;

a yoke plug attached to said housing for receiving the other end of said biasing member and for closing said sup ort yoke housing hole; and a damper made of a synthetic resin having at least a pillar-shaped member of which one end and the other end come in contact with said support yoke and said yoke plug, respectively wherein said biasing member is formed by a compression coiled spring disposed at the center portion of said support yoke housing hole, said pillar-shaped member is disposed inside of said compression coiled spring, and said damper has a ring-shaped member disposed around said compression coiled spring with one end and the other end of said ring-shaped member coming in contact with id support yoke and said yoke plug, respectively.

2. A rack-pin on type steering apparatus according to claim 1, wherein a metal sheet is interposed between said rack shaft and said support yoke.

3. A rack-pinion type steering apparatus according to claim 1, wherein said damper is made of a urethane re in.

4. A rack-pinion type steering apparatus according to claim 1, wherein a Belleville spring is interposed between the opposite end surfaces of said support yoke and said yoke plug.

5. A rack-opinion type steering apparatus according to claim 3, wherein a belleville spring is interposed between the opposite end surfaces of said support yoke and said yoke plug.

6. A rack-opinion type steering apparatus according to claim 3, wherein a metal sheet is interposed between said rack shaft and said support yoke.

7. A rack-opinion type steering apparatus according to claim 4, wherein a metal sheet is interposed between said rack shaft and said support yoke.

* * * * *